United States Patent [19]

Bea

[11] Patent Number: 4,666,592
[45] Date of Patent: May 19, 1987

[54] SELF-CLEANING FILTER, PARTICULARLY FOR FEED WATERS IN INDUSTRIAL PLANTS

[75] Inventor: Aldo Bea, Milan, Italy

[73] Assignee: Bea Filiri S.p.A., Italy

[21] Appl. No.: 863,956

[22] Filed: May 16, 1986

[30] Foreign Application Priority Data

Dec. 10, 1985 [IT] Italy .............................. 24122/85[U]

[51] Int. Cl.$^4$ .............................................. B01D 35/16
[52] U.S. Cl. .................................... 210/107; 210/108; 210/333.01
[58] Field of Search ................ 210/333.01, 333.1, 107, 210/108, 411

[56] References Cited

U.S. PATENT DOCUMENTS

| | | | |
|---|---|---|---|
| 3,703,465 | 11/1972 | Reece et al. | 210/333.1 |
| 4,059,518 | 11/1922 | Rishel | 210/333.1 |
| 4,162,219 | 7/1979 | Miropolsky et al. | 210/333.1 |

Primary Examiner—Frank Sever
Attorney, Agent, or Firm—Darby & Darby

[57] ABSTRACT

In a self-cleaning filter of known type comprising a cylindrical body, a removable cover, a plate provided with holes and defining an inlet and outlet chamber inside said body, filtering tube-shaped elements engaged at their open ends with the central plate and at their closed ends with a support plate rigidly connected to the central plate, cleaning tubes automatically sucking the stored material from said filtering elements and leading off to a reception tube rotated by external power means, the improvement consisting in that the support plate is engaged between the cover and the free end of the cylindrical body and is provided with additional holes in coaxial relation with the through holes of the central plate and engaging said filtering elements in the region of their respective closed ends, each of them being substantially composed of a closing wall disposed at a predetermined distance from the edge of the filtering element facing said cover and being furthermore provided with an annular shoulder abutting on said support plate.

The absence of threaded elements subject to corrosion makes the invention suitable for filtering sea water.

5 Claims, 4 Drawing Figures

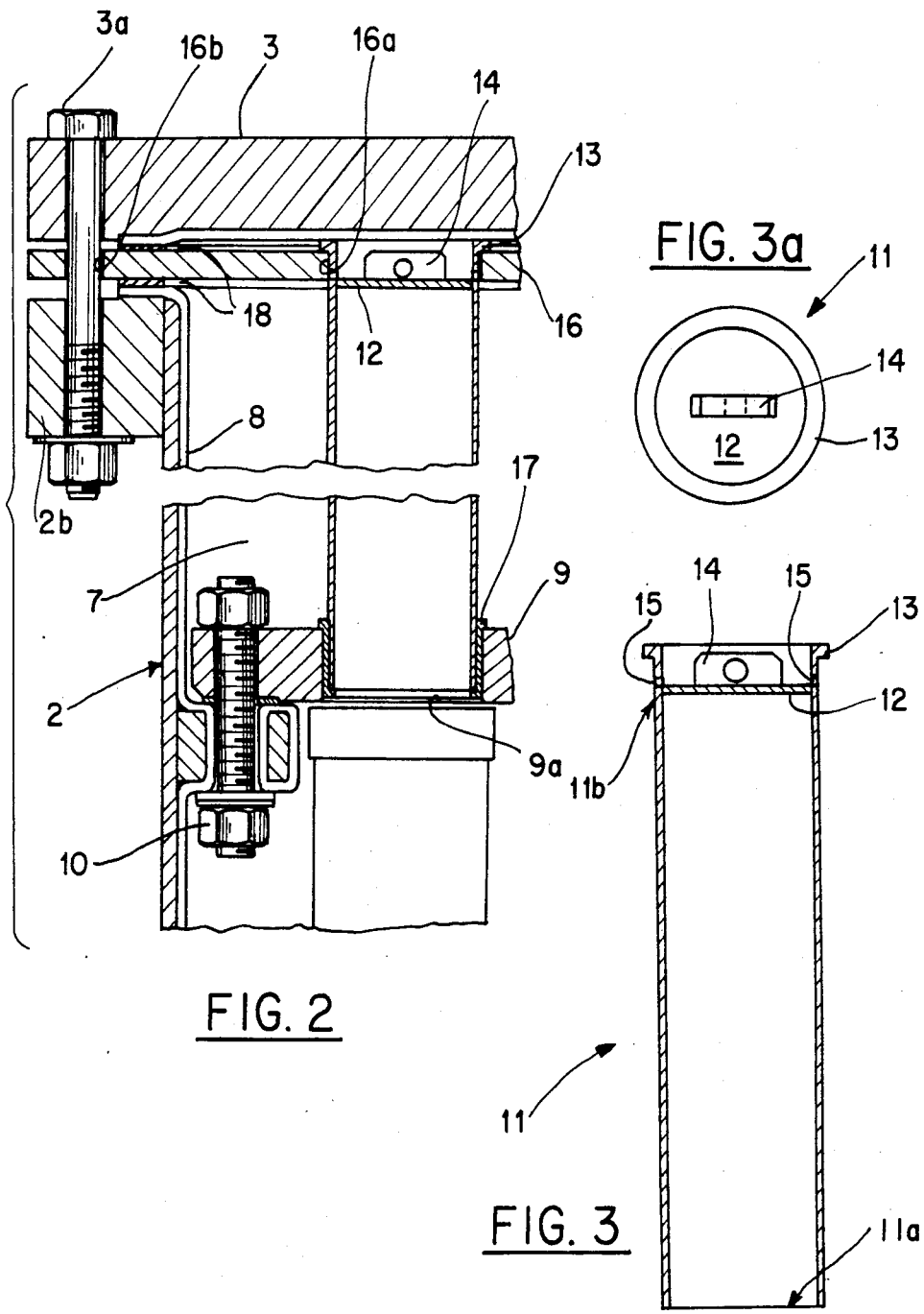

SELF-CLEANING FILTER, PARTICULARLY FOR FEED WATERS IN INDUSTRIAL PLANTS

BACKGROUND OF THE INVENTION

1. Field of the Invention

The present invention relates to a self-cleaning filter, particularly for feed waters in industrial plants. More specifically this filter is above all adapted to be used in cooling plants fed in with sea water.

It is known that many industries need the presence of cooling plants having an important water delivery in order to allow the correct operation of the corresponding production plants.

Due to obvious economical reasons, it often appears convenient to use water directly drawn from natural sources as a cooling fluid for said plants. In other words the feed water is directly drawn for example from a river, then it is passed through the plant and finally it is discharged into the river again. But the feed water thus obtained contains a number of suspending elements (mould, deposits or the like) which, if introduced into the cooling plant, could in a short time cause a remarkable decreasing in the effectiveness of the same. Thus the water is conveniently filtered before being introduced into the plant, by means of appropriate filters disposed upstream of the plant itself.

2. Prior Art

In this field of the industry many types of filters are already known and normally used; they are different from one another under many parameters such as for example the shape and arrangement of the filtering elements or the adopted filtering method.

One of said filters which is important to the ends of the present invention, carries out filtration letting the feed water pass through a number of filtering elements that are automatically cleaned when necessary through appropriate means.

More particularly, said filter comprises a cylindrical body within which a central plate provided with a series of through holes is fastened. The central plate defines an inlet chamber and an outlet chamber in said cylindrical body. When the feed water goes from the inlet to the outlet chamber it is obliged to pass through filtering elements which retain the solid particles suspended therein.

Each of said filtering elements substantially consists of a tubular body closed at one end, provided over the whole surface thereof with a plurality of calibrated holes.

Filtering elements of this type are commonly known in the sector under the name of "filtering candles".

Each filtering element is sealingly engaged at its open end with one of the through holes provided on the central plate. In the region of their respective closed ends said filtering elements are fastened to a support plate by means of screw threaded elements. The support plate, in turn, is rigidly connected to the central plate through a series of stud rods adapted to be screwed down into the latter and connected to the support plate itself through screw threaded elements.

Provision is also made for regeneration means adapted to restore the effectiveness of the filtering elements when the storing up of the material retained in the same inhibits water from passing therethrough.

Such regeneration means consists of cleaning tubes inside which the vacuum is created by a suction pump connected thereto. The cleaning tubes, moved by suitable devices, pass close to the open ends of the filtering elements and suck the material stored therein.

It is also provided that the regeneration means is automatically operated upon command of a differential pressure switch actuating it when the pressure gradient between the inlet chamber and the outlet chamber exceeds a predetermined limit value.

Although the filter briefly described hereinbefore has proved to be quite effective and of practical use under many situations, it is not very reliable when, as it often happens, it must be used to filter sea water or anyway water containing corrosive substances.

Such a drawback is due to the action of the corrosive agents present in the water, which very easily wear away the screw threaded connections causing, after a certain lapse of time, the separation between the corresponding members.

It is apparent that under this situation the removal of one or more of said filtering elements from their housings may occur or even the simultaneous removal of all said elements due to the detachment of the support plate from the central plate.

In both cases the above drawback will give rise, on one hand, to the ineffectiveness of the filter due to the fact that the water can freely pass from the inlet chamber to the outlet chamber without being filtered and, on the other hand, to the introduction of a plurality of fragments and metal particles into the plant. Obviously, in this case the cooling plant would be greatly damaged and the repairs would involve rather important expenses.

In order to avoid the occurrence of said damages it appears therefore necessary to replace the filtering elements and the respective plates prematurely, when they could still be used for a long time.

Said inconvenience is further made worse by the fact that, always due to said connections by means of threaded elements, the above described operation appears very long, difficult and hard.

OBJECTS

Under this situation, the object of the present invention is to provide a self-cleaning filter of the above described type, which could be adapted to be used for filtering sea water, or anyway water containing corrosive agents, without needing premature replacements of the filtering elements and of the corresponding plates, and without involving risks of damages to the corresponding cooling plant.

A further object of the present invention is to provide a filter adapted to enable a rapid and easy replacement of the filtering elements.

SUMMARY OF THE INVENTION

The foregoing and still further objects which will become more apparent in the following are substantially attained by a self-cleaning filter, particularly for feed waters in industrial plants, of the type comprising a cylindrical body provided with an open end upon which a cover fixed in a removable manner is disposed, as well as with at least an inlet pipe union and an outlet pipe union to which an inlet chamber and an outlet chamber respectively correspond, which chambers are separated from each other by a central plate extending according to a diametral plane inside the cylindrical body itself and provided with a series of through holes disposed according to one or more concentric circumferences; a series of filtering elements extending inside said outlet chamber, each of them exhibiting a closed end engaged with a support plate rigidly connected to a fixed portion of the filter and an open end sealingly engaged with one of said holes so that it is in communication with the inlet chamber, and one or more cleaning tubes, each of them corresponding to one of the circumferences according to which the through holes are disposed on the central plate and leading off to a reception tube connected to external exhaust means and rotated by external power means, wherein said support plate is engaged between the cover and the open end of the cylindrical body and is provided with a series of additional holes disposed in coaxial relation with said through holes of the central plate and engaging said filtering elements in the region of their respective closed ends, each of the latter being substantially composed of a closing wall disposed at a predetermined distance from the edge of the filtering element facing said cover and being furthermore provided with an annular shoulder abutting on said support plate.

BRIEF DESCRIPTION OF THE DRAWINGS

Further features and advantages will become more apparent from the detailed description of a preferred embodiment of a self-cleaning filter, particularly for feed waters in industrial plants, according to the present invention, given hereinafter by way of non-limiting example, with reference to the accompanying drawings, in which:

FIG. 2 shows a detail of FIG. 1, to an enlarged scale;

FIGS. 3 and 3a are an elevation and a plan view respectively of a filtering element of the type incorporated in the filter of the present invention.

DESCRIPTION OF THE PREFERRED EMBODIMENT

Figure 1:
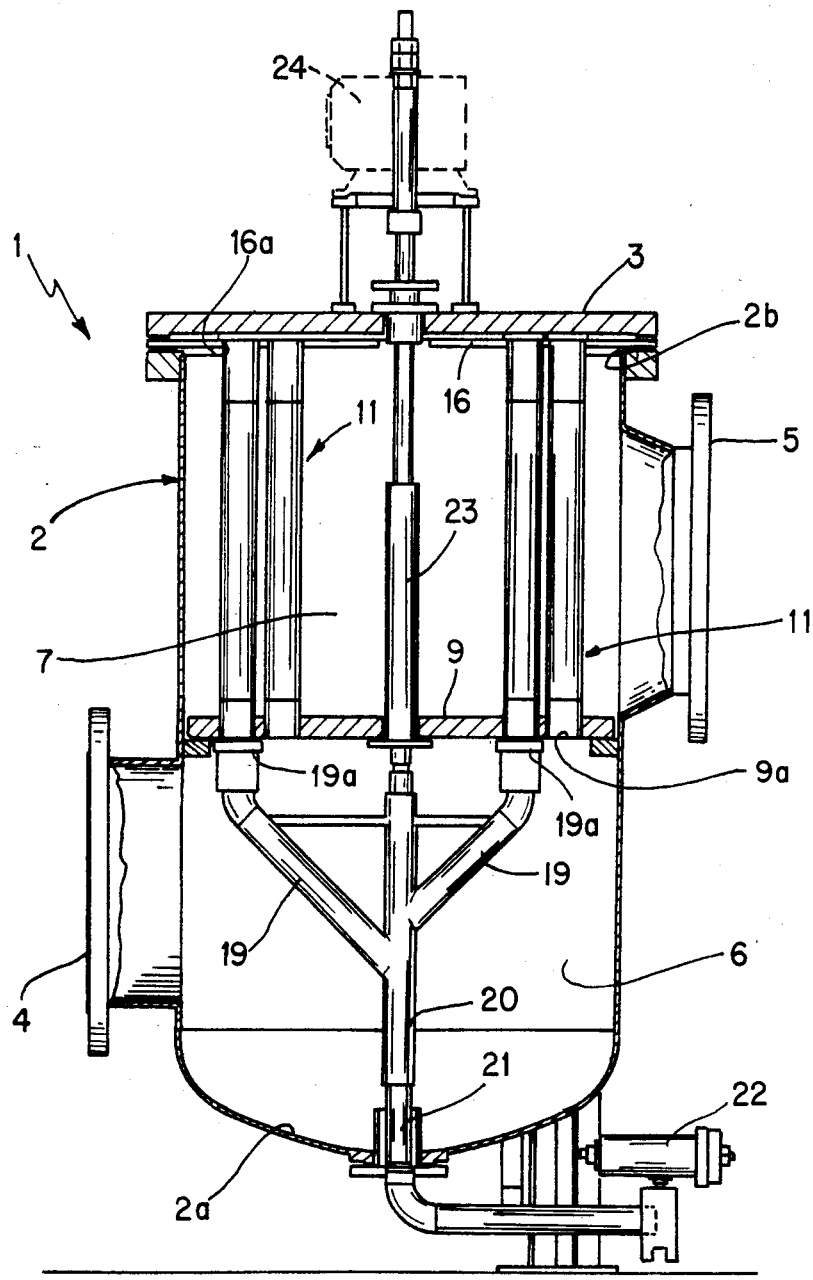
FIG. 1 is a cross-sectional elevation view of the self-cleaning filter according to the present invention.

With reference to the drawings, a self-cleaning filter, particularly for feed waters in industrial plants, according to the present invention has been globally identified at 1.

It comprises a vertically-disposed cylindrical body 2, exhibiting a closed bottom portion 2a and an open top portion 2b provided with a closing cover 3 connected thereto in a removable manner through fastening bolts 3a (FIG. 2).

The cylindrical body 2 is provided with an inlet pipe union 4 disposed at the lower part thereof and an outlet pipe union 5 disposed at the upper part thereof, to which an inlet chamber 6 and an outlet chamber 7 located inside the cylindrical body itself respectively correspond.

As best shown in FIG. 2, the inner surfaces of the cylindrical body are provided with an anticorrosive lining 8 adapted to protect the same from the action of the corrosive agents present in the water passed therethrough.

The inlet chamber 6 and the outlet chamber 7 are separated from each other by a central plate 9 fastened at the inside of the cylindrical body 2 through screw threaded connection elements 10 (FIG. 2) and extending according to the intermediate diametral plane of the cylindrical body 2.

The central plate 9 is provided with a series of through holes 9a, spaced apart from each other of the same distance and disposed according to one or more concentric circumferences, to each of said holes corresponding a filtering element 11 extending inside the outlet chamber 7.

In greater detail, the filtering elements 11 are of the type usually known in the art as "filtering candles". Each of them, more clearly shown in FIGS. 3 and 3a, is substantially composed of a tubular body exhibiting an open end 11a and a closed end 11b and provided over the whole surface thereof with a plurality of calibrated holes not shown in the figures. In an original manner, the closed end 11b substantially consists of a closing wall 12 located at a predetermined distance from the corresponding edge of the filtering element 11 facing the cover 3. This edge is in turn provided with an outer annular shoulder 13 for the purposes to be clarified later.

As shown in the figures, on the closing wall 12 and particularly on its surface facing the cover 13 provision is made for a lug 14 provided with a hole, adapted to define, on top of the filtering element 11, a grasping means aiming at facilitating the grasping and removal of said filtering element. Advantageously, on said surface of the closing wall 12 facing the cover 3 provision is also made for two transverse and diametrally-disposed exhaust holes 15, created in order to avoid water storing up on the closing wall 12.

As best shown in FIG. 2, each filtering element 11 is engaged, in the region of its open end 11a, with one of the through holes 9a provided on the central plate 9. Likewise, in the region of their closed ends 11b, said filtering elements 11 are engaged with additional holes 16a, machined on a support plate 16 and disposed coaxially with the through holes 9a, so that the filtering elements 11, once assembled, extend parallelly and vertically along the outlet chamber 7.

In greater detail, the open ends 11a of the filtering elements 11 are engaged with the respective through holes 9a upon interposition of a sealing element 17. Each closed end 11b is in turn engaged with the additional hole 16a in such a way that the corresponding filtering element 11 may be hanging from the support plate 16 by virtue of the outer annular shoulder 13.

In an original manner, the support plate 16 is engaged, upon interposition of sealing elements 18, between the cover 3 and the open end 2a of the cylindrical body 2. Furthermore, said plate is provided with centering holes 16b passed through by said fastening bolts 3a.

Advantageously, the support plate 16 and the cover 3 are mutually facing so that the outer annular shoulders 13 can be enclosed therebetween. As a result the complete fastening of the filtering elements 11 occurs and the movements of the latter are inhibited in all directions.

Referring particularly to FIG. 1, the filter is furthermore provided with regeneration means adapted to restore the effectiveness of the filtering elements 11, as clearly described in the following.

Said regeneration means comprises one or several cleaning tubes 19 located in the inlet chamber so that they lead off to a reception tube 20 also disposed in said inlet chamber and extending according to the axis of the cylindrical body 2. Each cleaning tube 19 terminates in register with the lower surface of the central plate 9 so that its free end 19a faces one of the circumferences along which the through holes 9a are located.

The reception tube 20 is in turn rotatably engaged, at its lower part, with a pipe fitting 21 bringing it into communication with a powered exhaust valve 22 located outside the cylindrical body 2. At its upper part the reception tube 20 is rigidly and coaxially connected to a drive shaft 23 located within the outlet chamber 7 and extending beyond the cover 3.

Close to the cover the drive shaft 23 is kinematically connected to a driving motor not shown, through the interposition of a reduction gear 24 fixed above the cover 3 and schematically shown in FIG. 1.

It is provided that the driving motor and the powered exhaust valve 22 are automatically operated upon command of a differential pressure switch not shown measuring the pressure gradient between the inlet chamber 6 and the outlet chamber 7.

Operation of the self-cleaning filter according to the invention described above mainly as regards structure, is as follows.

Assuming that the filter 1 has already been connected to the respective cooling plant, the cylindrical body 2 is continuously passed through by the feed water supplied through the inlet pipe union 4 and issuing through the outlet pipe union 5. Said feed water, once introduced into the inlet chamber 4 passes through the holes 9a and enters the filtering elements 11. When passing through said filtering elements the water is suitably filtered and it is afterwards fed to the outlet chamber 7 reaching then the cooling plant through the outlet pipe union 5.

As the water is filtered, the material retained by the filtering elements 11 is stored up inside the same. Said stored up material hinders the passage of water to the outlet chamber 7 which gives rise to an increase in the pressure gradient between said chamber and the inlet chamber 6. When the pressure gradient exceeds a predetermined limit value, the above mentioned pressure switch automatically operates the activation of the regeneration means.

As a result, the drive shaft 23 driven by the above mentioned motor causes the reception tube 20 and consequently the cleaning tubes 19 together with it, to rotate slowly. Due to said rotation, the free ends 19a of the cleaning tubes 19 are successively brought into communication with the through holes 9a. At the same time the powered valve 22 opens and, by effect of the pressure existing in the outlet chamber 7, causes the discharge of the material stored up inside the filtering elements 11 together with the water contained therein, which is called "couterwashing water".

When the optimal pressure gradient is restored, the pressure switch automatically closes the powered valve 22 and the filter is brought again to its normal operative conditions.

The present invention attains the intended purposes.

In fact, due to the absence of threaded elements of small thickness directly in contact with the feed water it is possible to use the self-cleaning filter 1 also for filtering sea water or anyway water containing corrosive agents without the risk of damaging the corresponding cooling plant.

Advantageously this enables the optimal exploitation of the filtering elements 11 and of the plates 9 and 16 since premature replacement of the same for the sake of safety is no longer necessary.

The filter in reference also allows a quick and easy replacement of the filtering elements 11. As a matter of fact, when said elements have to be removed it is sufficient, after taking the cover off, to hook them in the region of the holes provided on their lugs 14 and to pull them up until extraction. After that it is possible to introduce new filtering elements thereinto.

The removal of the support plate 16 also appears simplified if compared to the solutions adopted by the known art. Actually, once the cover has been taken off, said plate appears merely supported on the cylindrical body 2 and its removal can therefore take place without any further disassembling operation.

Many modifications and variations can be made to the present invention which all come within the scope of the inventive idea.

What is claimed is:

1. Self-cleaning filter particularly for feed waters in industrial plants, of the type comprising structure designed to minimize the effect of corrosion in feed water systems, including, a cylindrical body provided with an open end upon which a cover fixed in a removable manner is disposed, as well as with at least an inlet pipe union and an outlet pipe union to which an inlet chamber and an outlet chamber respectively correspond, which chambers are separated from each other by a central plate extending according to a diametral plane inside the cylindrical body itself and provided with a series of through holes disposed according to one or more concentric circumferences; a series of filtering elements extending inside said outlet chamber, each of them exhibiting a closed end engaged with a support plate rigidly connected to a fixed portion of the filter and an open end sealingly engaged with one of said holes so that it is in communication with the inlet chamber, and one or more cleaning tubes, each of them corresponding to one of the circumferences according to which the through holes are disposed on the central plate and leading off to a reception tube connected to external exhaust means and rotated by external power means, wherein said support plate is engaged between the cover and the open end of the cylindrical body and is provided with a series of additional holes disposed in coaxial relation with said through holes of the central plate and engaging said filtering elements in the region of their respective closed ends, each of the latter being substantially composed of a closing wall disposed at a predetermined distance from the edge of the filtering element facing said cover and being furthermore provided with an annular shoulder abutting on said support plate.

2. Self-cleaning filter according to claim 1, wherein each of said filtering elements is pressure-fixed by means of its external annular shoulder between said support plate and said cover.

3. Self-cleaning filter according to claim 1, wherein on said closing wall and in the region of the surface thereof facing said cover provision is made for a grasping housing.

4. Self-cleaning filter according to claim 3, wherein said grasping housing substantially consists of a lug provided with a hole.

5. Self-cleaning filter according to claim 1, wherein at least a discharge hole is provided in each of said filtering elements, which discharge hole is disposed transversely on the surface of the closing wall facing said cover.

* * * * *